UNSATURATED POLYESTER RESINOUS COMPOSITIONS

Filed July 20, 1966

10μ
x 600

INVENTOR
Charles H. Kroekel
BY Alvin T. Sigel[illegible]
Attorney

United States Patent Office 3,701,748

Patented Oct. 31, 1972

1

3,701,748
UNSATURATED POLYESTER RESINOUS COMPOSITIONS

Charles Henry Kroekel, Churchville, Pa., assignor to Rohm & Haas Company, Philadelphia, Pa.

Filed July 20, 1966, Ser. No. 566,580
Int. Cl. C08f *43/08, 45/10*
U.S. Cl. 260—40 7 Claims

ABSTRACT OF THE DISCLOSURE

This invention provides a liquid, polymerizable composition of matter, suitable for molding glass fibrous reinforced articles with exceptionally smooth surfaces, said composition being curable under heat and pressure to form a rigid, cured product which is characterized by an optically heterogeneous appearance. The composition comprises an $\alpha,\beta$-ethylenically unsaturated polymerizable polyester having a molecular weight per double bond factor of 150 to 186, a monomer containing a $$CH_2=C<$$

Figure 1:
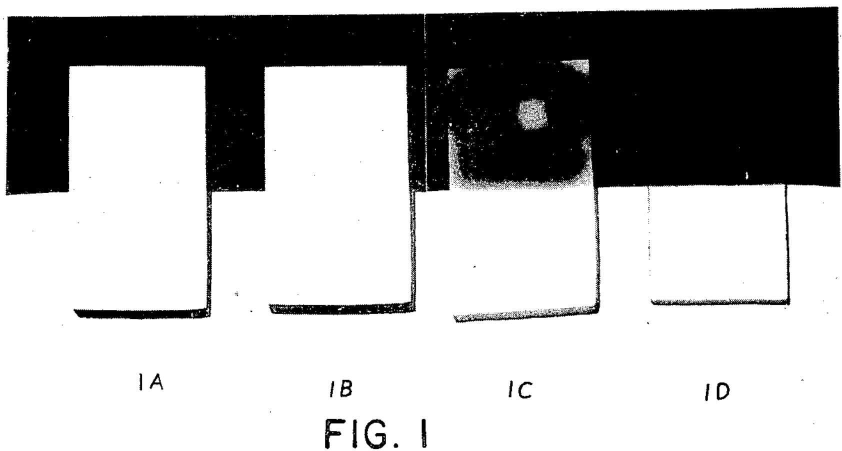

group copolymerizable with the unsaturated polyester, and a thermoplastic polymer which is soluble in the monomer but which, when present during the copolymerization of the unsaturated polyester and the monomer, yields an optically heterogeneous cured composition.

This invention is concerned with polymerizable resinous compositions (based on unsaturated polyesters) which exhibit little or no volume shrinkage when cured, and which, as a result, yield glass fiber reinforced or other fibrous reinforced articles with exceptionally smooth surfaces when cured under the usual conditions of heat and pressure.

The use of unsaturated polyester resins in the molding of glass fiber reinforced or other fiber reinforced products enjoys broad application in the manufacture of such products as automobile bodies, chairs, heater housings, trays, etc. Some of the advantages of such products over metals include light weight, high strength to weight ratio, resistance to corrosion, and part design flexibility. A significant disadvantage of prior art products is that they have rough and undulating surfaces exhibiting a characteristic pattern of the reinforcing fibers. The rough surfaces are attributable, at least in part, to the shrinkage in volume which occurs as the resin polymerizes. While this may not be the only factor contributing to the poor surface smoothness of the moldings, it is thought to be a predominant factor.

Many applications for which fiber reinforced resinous laminates are used are not critical with respect to surface smoothness, but in certain uses such as automobile surface parts for example, the characteristic rought surface is objectionable. Techniques useful for improving smoothness of glass fiber reinforced moldings which find limited utility include the use of resin-rich gel coats or veil-like glass fiber surfacing mats. In both instances a resin-rich surface is obtained which serves to submerge the reinforcing glass strands and make them less noticeable. These techniques add processing steps and/or cost to the production of the articles.

Often it is desirable to paint moldings used in automotive applications, for example, to achieve a smooth, metal like, high-gloss appearance. In order to accomplish this it is common practice to resort to time and manpower-consuming dry sanding operations to improve the surface smoothness before applying the finish coating. Such a surface correcting technique is used in the

2 present production of glass fiber reinforced polyester automobile bodies. In this application the cost of the dry sanding is a substantial factor in the overall cost of finishing the automobile bodies.

The present invention avoids the application of resin-rich gel coats or expensive and time-consuming sanding or other mechanical pre-finishing operations. By utilizing the compositions, as hereinafter more fully described, articles are produced which have a high degree of surface smoothness, sufficient in most instances to allow direct application of a protective and decorative coating such as paint lacquer, etc., and which produce faithfully and with high fidelity the mold design with which they may have been made. These objectives are achieved by utilizing a polymerizable resinous composition which consists essentially of (1) a polycondensation product of an $\alpha,\beta$-ethylenically unsaturated dicarboxylic acid and a dihydric alcohol, (2) a thermoplastic polymer, and (3) a monomeric liquid substance having at least one polymerizable reactive $$CH_2=C<$$

group and in which the foregoing ingredients are soluble. The two polymeric ingredients may or may not be compatible when dissolved in the liquid monomer and blended; however, the composition must be such that upon crosslinking under the usual conditions of heat and pressure an optically heterogeneous, nearly opaque product, or opaque product, is formed which, when examined microscopically, exhibits a definite two-phase structure indicative of incompatibility.

The invention is based upon the discovery that through the use of specific combinations of the three components described above the overall polymerization shrinkage is at most very low. Conventional unsaturated polyester/monomer resins exhibit about 7 to 10% volume shrinkage on cure. The compositions of my invention shrink at most about 5% by volume while in many instances expansion of up to about 10% takes place upon curing. Although it is not our intent to be bound by any particular mechanism for this unusual behavior, it has been noted that there is a definite relationship between the observed heterogeneity or incompatibility of the cured compositions and the phenomenon of low shrinkage and/or expansion on cure. The reduction or elimination of cure shrinkage in the polymerizing resinous compositions of this invention manifests itself in glass fiber reinforced molding to the extent that the surfaces of the cured composites are extremely smooth and devoid of fiber prominence, thereby achieving a degree of surface quality and mold surface reproduction unattainable with liquid polymerizable resinous compositions of the prior art.

The compositions described herein may be used in premix and preform or mat molding applications well known in the art. In the case of premix molding liquid resins are intimately mixed with inert particulate fillers, chopped glass or other varieties of fibers, colorants or pigments, release agents, and polymerization initiators in an intensive mixer. The resulting doughlike mass is easily handled and is charged in weighed quantities to a matched metal die mold maintained at an elevated temperature (212–350° F.) and pressure applied (100–1500 p.s.i.) for a period of 15 seconds to fifteen minutes to affect crosslinking of the resin to form a rigid, cured product which is ejected hot from the mold. In preform or mat molding the resin may be used in the neat form or mixed with inert particulate fillers (maintaining a fluid consistency). Glass fiber fabrics may also be used either alone or in combination with glass fiber mats. Colorants, pigments, release agents, and polymerization initiators are also incorporated into the mixtures. The fluid mixture is poured over preformed chopped glass strands or chopped or continuous strand glass fiber mat, each of which may contain a polymeric binder, and placed in a matched metal die mold where flow of the resin mixture is accomplished and the cross-linking reaction affected under condition of moderate heat and pressure (see above under premix).

Useful premix formulations may cover a wide range of compositions as follows:

| | Parts by wt. |
|---|---|
| Resin | 20–60 |
| Fillers | 20–60 |
| Reinforcing fibers | 5–40 |

In preform moldings the resin may be used in the neat form or mixed with fillers (up to 70% by weight of filler). Reinforcing fiber content of preform-type moldings may be varied from 5 to 60 parts by weight of the cured composite.

DESCRIPTION OF COMPOSITION

(1) Unsaturated polyester

Of the three principal components of the invention the unsaturated polyester is the most critical with respect to chemical structure limitations. The polyester is used in amounts ranging from 20 to 70 parts by weight of the total three component resinous system, and preferably in amounts ranging from 30 to 50 parts by weight. The class of unsaturated polyesters in itself is not unique and methods of preparing them are well known. Such polyesters may be prepared by condensing an $\alpha,\beta$-ethylenically unsaturated dicarboxylic acid or anhydride or mixtures thereof with a dihydric alcohol or mixtures of dihydric alcohols. (The term dicarboxylic acid is intended to include anhydrides of the acids which form anhydrides.) Preferred examples of unsaturated dicarboxylic acids which may be used are maleic or fumaric acids; however, citraconic, chloromaleic acids and the like may have value in certain instances. A minor proportion of the unsaturated acid, up to about 25 mole percent, may be replaced by saturated dicarboxylic acids, examples of which are O-phthalic, isophthalic, terephthalic, succinic, adipic, sebacic, methylsuccinic acids and the like. It is preferred that the carboxylic acid present in the polyester of this invention be entirely an unsaturated variety as the maximum crosslinking potential represented by such polyesters plays an important role in the performance of the three component resinous composition. Dihydric alcohols that are useful in preparing the polyesters include 1,2-propanediol (hereinafter referred to as propylene glycol), dipropylene glycol, diethylene glycol, 1,3-butanediol, and the like.

Unsaturated linear polyesters useful in the present compositions can be further defined in terms of degrees of unsaturation. The polyester chain molecular weight per double bond (or repeating unit) provides a convenient means of numerically defining the degree of unsaturation of a given polyester. Unsaturated polyesters which have M.W./—C=C— (molecular weight to carbon, carbon double bond) factors of about 150 to about 186 are of primary interest in this invention. Fumaric or maleic based polyesters are preferred because of their effectiveness in the three component systems. Examples of suitable unsaturated polyesters are the polycondensation products of (1) propylene glycol and maleic or fumaric acids; (2) 1,3-butanediol and maleic or fumaric acids; (3) combinations of ethylene and propylene glycols (50 mole percent or less of ethylene glycol) with maleic or fumaric acids; (4) combinations of propylene glycol and of dipropylene glycol (50 mole percent or less of the latter) with maleic or fumaric acids; and (5) diethylene glycol and maleic or fumaric acids. These examples are intended to be illustrative of suitable polyesters and are not intended to be all-inclusive.

The acid number to which the polymerizable unsaturated polyesters are condensed is not particularly critical with respect to the ability of the three component system to cure to the desired incompatible product. Polyesters having been condensed to acid numbers of less than 100 are generally useful, but acid numbers less than 70 are preferred. The molecular weight of the polymerizable unsaturated polyester may vary over a considerable range, but ordinarily those polyesters useful in the practice of the present invention have a molecular weight ranging from about 500 to 5000, and more preferably, from about 700 to about 2000.

(2) Thermoplastic polymer

Compositions of the invention contain a thermoplastic polymer, preferably of a substance or mixture of substances having a polymerizable reactive $$CH_2=C\langle$$

group. The polymers used may or may not yield liquid compatible mixtures when combined with the unsaturated polyesters in monomer solution. Those mixtures which tend to separate into two liquid layers on long term standing are operative if the phases are mixed thoroughly just before the resin is used; for example, in premix or preform molding processes. It is required that when the subject three component liquid compositions (whether compatible or not) are cured under heat and pressure, the cured mass must remain or become incompatible for the phenomena of low shrinkage or expansion to take place. The gross incompatibility of the cured compositions is seen when samples are examined microscopically, with reflected light, for example, at 40–60×, or at higher magnification, and takes the form of a distinct two phase structure consisting typically of white or off-white spheres dispersed in a clear matrix. Thermoplastic polymers useful in the present compositions include, for example, homopolymers of methyl methacrylate, ethyl methacrylate, butyl methacrylate, methyl acrylate, ethyl acrylate, styrene, copolymers of methyl methacrylate and lower alkyl esters of acrylic and methacrylic acids, and copolymers of methyl methacrylate with minor amounts of one or more of the following: lauroyl methacrylate, isobornyl methacrylate, acrylamide, hydroxyethyl methacrylate, styrene, 2-ethylhexyl acrylate, acrylonitrile, methacrylic acid, methacrylamide, methylol acrylamide, and cetyl stearyl methacrylate. Other useful examples of the thermoplastic polymer are styrene/acrylonitrile copolymers, vinyl chloride/vinyl acetate copolymers, cellulose acetate butyrate, and cellulose acetate propionate.

Molecular weight of the thermoplastic polymers useful in this invention may vary over a wide range, from 10,000 to 10,000,000. The preferred molecular weight range is 25,000 to 500,000.

The thermoplastic polymer should be present in amounts ranging from 1 to 25 parts by weight based on the total three component resinous system. Preferred concentrations of thermoplastic polymer are in the 5 to 20 parts by weight range.

(3) Monomer

The third essential constituent of the invention is a monomeric liquid substance (or mixture of monomers) having at least one polymerizably reactive $$CH_2=C\langle$$

group per molecule. The monomeric liquid substance must be copolymerizable with the unsaturated polyester and develop therewith a crosslinked or thermoset structure; it must also have the ability to dissolve the unsaturated polyester (1) above and the thermoplastic polymer (2) above over a wide range of concentrations. Examples are styrene and vinyl toluene either as the sole monomer or in combination with minor amounts (<50% by weight) of other monomeric substances such as lower alkyl esters of acrylic or methacrylic acids, chlorostyrene, 1,3-butanediol dimethacrylate, diallyl phthalate, and the like.

The monomeric liquid is used in amounts ranging from 30 to 70 parts by weight of the total three component resinous composition and preferably between 40 and 60 parts by weight.

When the resinous compositions of the present invention are to be cured, peroxidic or other conventional initiators are incorporated. Useful initiators include benzoyl peroxide, t-butyl peroctoate, di-t-butyl peroctoate, t-butyl perbenzoate, cyclohexanone peroxide, di-t-butyl peroxide, and the like. The initiators are added to the resin system before the processing steps in amounts such that the composition will remain fluid for the length of time required for processing. Useful concentrations of initiator range from 0.1% to 3% based on the three component resinous composition. Curing of the composition is carried out under heat and pressure, as heretofore noted, typically, in closed, preferably positive pressure type molds. Polymerization inhibitors and accelerators and mold release agents may be added to the compositions to perform their normal function, as is well understood in the art.

In the specification, the examples and the claims, all parts and percentages are by weight unless otherwise noted.

EXAMPLE 1

(a) A three-component resinous composition is prepared as follows: An unsaturated polyester, herein designated as (I), (prepared by esterifying 1.05 moles of propylene glycol with 1.0 mole of maleic anhydride to an acid number of 52) is dissolved in styrene at 62.5% solids. This unsaturated polyester has a M.W./—C═C—factor of 156. A thermoplastic copolymer, herein designated as (II), of methyl methacrylate and ethyl acrylate (87/13 weight ratio) having a molecular weight of about 150,000 is dissolved in styrene at 31.3% solids. Sixty parts of the styrene solution of (I) are blended with 40 parts of the styrene solution of (II) to yield a liquid resinous composition exhibiting incompatibility, i.e., on long term standing it separates into two liquid layers. It is important that the liquid resinous composition be mixed thoroughly before use to insure complete distribution of the phases. The overall composition of the resin is as follows:

(III)

| | Parts |
|---|---|
| Unsaturated polyester (I) | 37.5 |
| Thermoplastic polymer (II) | 12.5 |
| Styrene | 50.0 |

(b) A resinous composition is prepared as in (a) except that the thermoplastic copolymer is omitted. The composition of this resin is:

(IV)

| | Parts |
|---|---|
| Unsaturated polyester (I) | 37.5 |
| Styrene | 50.0 |

(c) For control purposes a conventional unsaturated polyester/styrene resin is selected, herein designated as (V). It is the polycondensation product of dipropylene glycol and maleic anhydride (1.05/1.0 mole ratio) having an acid number of 20 and is dissolved in styrene at 75% solids.

(d) Portions of resins (III), (IV), and (V) are cured in the neat form, using 1% t-butyl peroctoate by weight as initiator, under positive pressure of 400 p.s.i. at 250° F. in a press. Cured resin (III) has a white, nearly opaque appearance to the naked eye, and microscopic examination (40× magnification) clearly shows it to have a two-phase, incompatible structure consisting of a clear continuous matrix in which are dispersed white spheres. Cured resins (IV) and (V) are essentially transparent, an appearance typical of cured unsaturated polyester/monomer resins known in the art. Volume changes which occur as a result of the polymerization are determined by measuring the specific gravities of the liquid and cured resins and using the equation:

Percent volume shrinkage $$= \frac{\text{S.G. cured} - \text{S.G. liquid}}{\text{S.G. cured}} \times 100$$

| Resin: | Percent volume shrinkage |
|---|---|
| (III) (2.9% expansion) | −2.9 |
| (IV) | 10.6 |
| (V) | 7.6 |

The usual behavior of (III) is illustrative of the compositions of the present invention and (IV) shows the pronounced effect of the removal of the thermoplastic copolymer. The shrinkage of (V) is typical of resins of the prior art.

(e) Thirty-five parts of (III), (IV), and (V) are incorporated separately into premix formulations with other ingredients as follows:

| | Parts |
|---|---|
| Clay filler | 35 |
| Asbestos | 5 |
| ¼" glass fibers | 25 |

Release agent Zelec UN (Du Pont trademark) is added at 0.5% based on the total weight of the premix, and t-butyl peroctoate is added to the resinous composition at 1% by weight.

The catalyzed resinous compositions, together with clay, asbestos, and release agent are mixed in a sigma blade mixer for three minutes to form a smooth paste-like consistency. The glass fibers are then added and mixing is continued for five more minutes. The premixes are removed from the mixer and have a fluffy, dough-like appearance and very slight tack. Weighed portions of each of the premixes based on (III), (IV), and (V) are charged to a tote box mold fixed in a 50-ton molding press and cured in one minute at 300° F. using a pressure of 500 p.s.i. The cured tote boxes are ejected from the mold at the molding temperature.

The tote box based on (III) has extremely smooth surfaces, while the boxes based on (IV) and (V) have grossly undulating surfaces typical of premix moldings made from unsaturated polyester/monomer resins of the prior art. Measurements of surface profile (smoothness) are obtained by traversing the surfaces of the tote boxes with a specially modified linear differential transformer and continuously recording the fluctuations. Surface roughness is expressed as microinches of waviness in a two-inch surface scan (average of at least two 2-inch scans). In the results which are tabulated below, surface roughness varies directly with the value of the reading, i.e., the greater the numerical value, the more the surface roughness.

| Premix tote box: | Av. surface roughness (microinches in 2" scan) |
|---|---|
| Based on (III) | 900 |
| Based on (IV) | 3400 |
| Based on (V) | 4880 |

These results illustrate the pronounced improvement in surface smoothness obtained by using a resinous composition typical of this invention. The mechanical properties of the premix molding based on resin (III) are found to be in a commercially acceptable range.

EXAMPLE 2

(a) A resinous composition is prepared as follows: The unsaturated polyester (I) of Example 1, part (a) is dissolved in styrene at 62.5% solids. A thermoplastic copolymer, herein designated as (VI), of methyl methacrylate and ethyl acrylate (87/13 weight ratio) having a molecular weight of about 100,000 is dissolved in styrene at 27.8% solids. Sixty-four parts of the styrene solution of (I) are blended with 36 parts of the styrene solution of (VI) to yield a liquid resin exhibiting incompatibility which looks much like resin (III) in Example 1. The overall composition of this resin is as follows:

(VII)

| | Parts |
|---|---|
| Unsaturated polyester (I) | 40 |
| Thermoplastic polymer (VI) | 10 |
| Styrene | 50 |

(b) A resin is prepared as in (a) except that the thermoplastic copolymer is omitted. The composition of this resin is:

(VIII)

| | Parts |
|---|---|
| Unsaturated polyester (I) | 40 |
| Styrene | 50 |

(c) For control purposes a conventional resin ((V)—Example 1) is selected.

(d) Portions of resins (VII), (VIII), and (V) are cured in the neat form as in Example 1(d). Cured resin (VII) has a white, substantially opaque appearance indicative of incompatibility. Microscopic examination shows a two-phase structure. Cured resins (VIII) and (V) are transparent. Volume changes on cure are determined as in Example 1(d).

| Resin: | Percent volume shrinkage |
|---|---|
| (VII) (2.5% expansion) | —2.5 |
| (VIII) | 10.5 |
| (V) | 7.6 |

The unusual and unexpected behavior of the three component resin (VII) is obvious.

(e) The same three resins, i.e., (VII), (VIII), and (V), are used to prepare laminates containing glass fiber reinforcement. The glass reinforcement is in the form of a sandwich construction consisting of one ply of 2 oz./ft.$^2$ continuous strand reinforcing mat between two plies of a loose, square weave glass cloth, so that the coarse texture of the cloth would be reflected in the surface quality of the cured laminates which are about 0.1 inch thick. The laminates are made in a positive pressure mold at 250° F. using pressure of 200 p.s.i. and are cured for ten minutes (1% t-butyl peroctoate as initiator). The glass reinforcing materials are placed in the mold cavity, the resin poured over them, and pressure is applied. The cured laminates are ejected hot from the mold.

The laminate based on (VII) has smoother surfaces than the (VIII) and (V) laminates. Measurements of surface profile are made.

| Glass reinforced laminate: | Av. surface roughness (microinches in ½" scan) |
|---|---|
| Based on (VII) | 570 |
| Based on (VIII) | 883 |
| Based on (V) | 1010 |

(f) The same three resins are used to prepare laminates having the same glass reinforcement configuration as in (e) above, but in this case the resins are mixed with a typical clay filler (60/40-resin/clay ratio) to simulate compositions widely used in commercial applications. The laminates are molded using the conditions as in (e) above. Surface profile measurements are made.

| Glass reinforced laminate (60/40 resin/clay): | Av. surface roughness (microinches in ½" scan) |
|---|---|
| Based on (VII) | 130 |
| Based on (VIII) | 497 |
| Based on (V) | 482 |

Again, the advantage of three component resin composition of the present invention is demonstrated.

(g) Glass fibermat mouldings are made using (VII) and (V) following procedures well known in the art. Tote box moldings 0.080" thick are made using two plies of 2 oz./ft.$^2$ continuous strand glass reinforcing mat and one ply of 10 ml glass surfacing mat at each surface. The following formulation is used.

| | Parts |
|---|---|
| Resin | 60 |
| Clay filler | 40 |

An initiator, t-butyl perocotoate, is added at 0.5% based on the resin, and a release agent (Zelec UN, Du Pont trademark) is added at 0.5% based on the total mix. Tote box moldings are made in a matched metal die mold using positive pressure (300 p.s.i.), at 250° F. and are cured for three minutes. The tote box made with (VII) has extremely smooth surfaces free from the characteristic fiber prominence which is displayed by the tote box made with (V). Surface profile measurements are made.

| Preform-type molding: | Av. surface roughness (microinches in ½" scan) |
|---|---|
| Based on (VII) | 288 |
| Based on (V) | 916 |

Acceptably smooth painted surfaces on the (VII) based molding can be obtained without using any surface preparation, while the (V) based molding requires extensive corrective dry sanding before painting in order to obtain an acceptable finish.

EXAMPLE 3

An unsaturated polyester (prepared by esterifying 1.05 moles of 1,3 butanediol with 1.0 mole of maleic anhydride to an acid number of 22.3) is dissolved in styrene at 62.5% solids. This polyester has a M.W./—C=C— factor of 170, representing a degree of unsaturation within the range outlined in the specification hereinbefore. A thermoplastic copolymer (II) as described in Example 1 is dissolved in styrene at 31.3% solids. Sixty parts of the polyester/styrene solution are blended with 40 parts of the thermoplastic copolymer/styrene solution to yield an incompatible liquid resinous system. Mixing before use is again required. The overall composition of the resinous system, herein designated as (IX) is: unsaturated polyester/thermoplastic copolymer/styrene — 37.5/12.5/50.0 parts.

A portion of the neat resin (IX) is cured as described in Example 1(d) and shrinkage on cure is calculated to be only 1.0% by volume. The cured resin is white and substantially opaque and microscopic examination reveals the characteristic two-phase structure.

A portion of (IX) is used to prepare a glass fiber reinforced laminate as described in Example 2(e). The laminate has average surface roughness (in a ½" scan) of 621 microinches. A similar laminate based on a conventional control resin has a roughness value of 1010 microinches (see Example 2(e), laminate based on (V)).

EXAMPLE 4

The following resin is prepared to illustrate a three-component composition based on an unsaturated polyester which falls outside of the limits set forth in the specification. An unsaturated polyester (prepared by esterifying 2.1 moles of propylene glycol with 1.0 mole of phthalic anhydride and 1.0 mole of maleic anhydride to an acid number of 48) is dissolved in styrene at 62.5% solids. This polyester has a M.W./—C=C— factor of 362, above the useful range. A thermoplastic copolymer (II) as described in Example 1 is dissolved in styrene at 31.3% solids. Sixty parts of the polyester/styrene solution is blended with 40 parts of the thermoplastic copolymer/styrene solution to yield an incompatible liquid resin having the following overall composition (X): unsaturated polyester/thermoplastic copolymer/styrene — 37.5/12.5/50.0 parts.

A portion of neat resin (X) is cured as in Example 1(d) and the volume shrinkage on cure is calculated to be 8.8%.

A portion of resin (X) is used to prepare a glass fiber reinforced laminate by the method described in Example 2(e). The laminate has average surface roughness (½" scan) of 1161 microinches. The poor surface smoothness and high cure shrinkage shown by this resin illustrates a three component system outside the scope of this invention.

EXAMPLE 5

An unsaturated polyester (I) as described in Example 1 is dissolved in styrene at 62.5% solids. A thermoplastic copolymer (II), also described in Example 1, is dissolved at 31.3% solids in a methyl methacrylate-styrene monomer mixture (45.5/54.5 ratio). Sixty parts of the polyester/styrene solution is blended with 40 parts of the styrene-methyl methacrylate solution of the thermoplastic copolymer to yield an incompatible resin having an overall composition, herein designated as (XI), as follows: unsaturated polyester/thermoplastic polymer/styrene/methyl methacrylate—37.5/12.5/37.5/12.5 parts.

A portion of neat resin (XI) is cured as described in Example 1(d) and the shrinkage on cure is calculated to be 3.6% by volume, substantially lower than that exhibited by conventional resins of the prior art. The cured product is white and opaque, indicative of incompatibility.

A further portion of resin (XI) is used to prepare a glass fiber reinforced laminate by the method described in Example 2(e). Average surface roughness (in ½" scan) of the laminate is 562 microinches, a degree of surface smoothness much improved over that obtained with conventional resin.

EXAMPLE 6

Resin (III) described in Example 1 is prepared using vinyl toluene in place of the styrene. This resin, herein designated as (XII), exhibits incompatibility in the liquid state and tends to separate into two liquid layers on long term standing. A portion of freshly mixed (XII) is cured in the neat form as described in Example 1(d) and calculations show that a volume expansion of 0.3% occurs. The cured product is typically white and opaque and it displays the characteristic two phase structure.

Another portion of (XII) is used to prepare a glass fiber reinforced laminate by the method described in Example 2(e). The surface profile of the laminate is determined to be 450 microinches, average roughness in ½" scan, again an indication of smooth surface when compared with the conventional resin control (1010 microinches).

EXAMPLE 7

A polyester (I) described in Example 1 is dissolved in styrene at 62.5% solids. A thermoplastic copolymer of methyl methacrylate and styrene (65/35 weight ratio) having a molecular weight of about 100,000, herein designated as (XIII), is dissolved in styrene at 31.3% solids. Sixty parts of the polyester/styrene solution are blended with 40 parts of the styrene solution of thermoplastic copolymer (XIII) to yield an incompatible liquid resin with limited phase distribution stability, herein designated as (XIV). The overall composition of the resin (XIV) is: unsaturated polyester (I) thermoplastic copolymer (XIII)/styrene—37.5/12.5/50 weight ratio.

Resin (XIV) is cured in the neat form as in Example 1(d). Calculations based on the specific gravities of the liquid and cured resin show that the composition expands 5.3% by volume during cure. The cured material has the characteristic incompatibility.

A portion of the resin (XIV) is used to prepare a glass fiber reinforced laminate by the method described in Example 2(e). The laminates have average surface roughness (½" scan) of 207 microinches, which is indicative of an outstandingly smooth surface.

EXAMPLE 8

A polyester (I) described in Example 1 is dissolved in styrene at 62.5% solids. A thermoplastic copolymer, herein designated as (XV), of methyl methacrylate with hydroxyethyl methacrylate (85/15 weight ratio) having a molecular weight of about 50,000 is dissolved in styrene at 27.8% solids. Sixty-four parts of the styrene solution of polyester (I) is blended with 36 parts of the styrene solution of thermoplastic copolymer (XV) to yield a compatible, clear liquid resin, herein designated as (XVI). The resin displays no tendency to separate into two layers on standing for two months at room temperature. The composition of this resin (XVI) is unsaturated polyester (I)/thermoplastic copolymer (XV)/styrene—40/10/50 weight ratio.

A portion of resin (XVI) is cured in the neat form as described in Example 1(d). The cured resin is white and opaque and exhibits the characteristic two-phase structure under magnification. Volume shrinkage on cure of this resin is 3.0%.

A portion of resin (XVI) is mixed with clay filler (60/40 resin/filler weight ratio) and used to prepare a glass fiber reinforced laminate by the method described in Example 2(f). Average surface roughness (½" scan) of the laminate is 130 microinches, a degree of surface smoothness unattainable in like laminates prepared from conventional polyester styrene resins.

Figure 2:
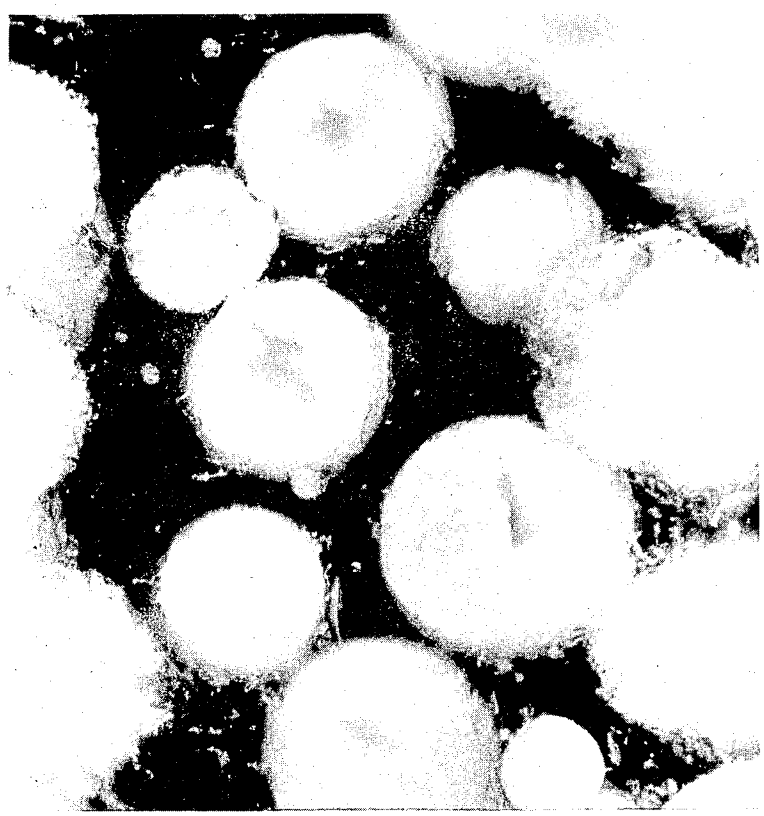

The term "optically heterogeneous," as used in the specification and claims refers to the appearance of the cured, polymerizable composition. Without magnification, that is to the naked eye, the appearance of the cured, neat (i.e., unfilled and unreinforced) composition generally appears white, off-white, or white with gray areas. This opaque or nearly opaque appearance may be seen in FIG. 1, wherein specimens 1*a* and 1*b* are characteristic of the present invention while specimens 1*c* and 1*d* are characteristic of the prior art. The specimens are each approximately $1/10$" thick and have been photographed with reflected light. Specimen 1*a* is the cured composition of Example 1(a) above. Specimen 1*b* is the cured composition obtained by polymerizing a polyester based on maleic anhydride and a mixture of propylene glycol and dipropylene glycol (1 to 1 mole ratio), styrene monomer and a thermoplastic acrylic polymer consisting of methyl methacrylate and ethyl acrylate (87/13 weight weight ratio). Specimen 1*d*, which is clear, is the crosslinked product prepared by copolymerizing a styrene solution of an unsaturated polyester based on dipropylene glycol and maleic anhydride, (Example 1(c) above). Specimen 1*c*, which is quite translucent, is compositionally the same as specimen 1*d*, except that it contains an acrylic copolymer of methyl methacrylate and ethyl acrylate (87/13 weight ratio). Under magnification, the optically heterogeneous cured composition appears as a distinct two-phase system or structure characterized by white, off-white, or white and gray spheres dispersed in a clear matrix. This may be seen by reference to FIG. 2, wherein there is shown a photomicrograph of a microtone section of specimen 1*a* of FIG. 1 (same composition as that of Example 1(a)). The section was mounted in a slide with Canada balsam, and photographed with 600× magnification using reflected light and a dark background.

It has been determined that the spheres which are dispersed in the clear matrix are essentially made up of the thermoplastic polymer, hereinbefore defined, while the matrix is essentially the crosslinked copolymer resulting from the copolymerization of the unsaturated polyester and the crosslinking monomer containing at least one reactive $$CH_2{=}C\langle$$

group per molecule, as hereinbefore defined. Thus, the thermoplastic polymers which are useful in the present invention are those which are incompatible or essentially polyester and the crosslinking monomer containing at least one polymerizably reactive $$CH_2=C<$$

group per molecule.

Calculation of the molecular weight per double bond factor (M.W./—C=C—), referred to in the specification and claims, is illustrated below for the unsaturated polyester of Example 1(a); i.e., based on maleic anhydride and propylene glycol. The molecular weight of maleic anhydride is 98, the molecular weight of propylene glycol is 76; the sum of these two members is 174 and subtracting therefrom the molecular weight (M.W.=18) of one mole of water which is split out during the condensation reaction, gives the value of 156 for the factor.

Fillers, usually inert and inorganic material useful with the compositions of the present invention include, for example, clay, talc, calcium carbonate, silica, calcium silicate, etc. "Reinforcing fibers" or "fibrous reinforcement" as used in the specification and claims is taken to mean glass fibers in one form or another, such as glass fabrics, chopped glass strands, chopped or continuous strand glass fiber mat; however, the terms also include reinforcing agents which, while less effective, may also be used if desired, for example, asbestos, cotton, synthetic organic fibers, and metals.

I claim:

1. A method of producing a fibrous reinforced article with smooth surfaces which comprises providing a liquid, polymerizable composition of matter comprising (a) 20 to 70 parts by weight of an α,β-ethylenically unsaturated polymerizable polyester having a molecular weight per double bond factor of 150–186, (b) 25 to 75 parts by weight of a monomer containing a $$CH_2=C<$$

group polymerizable with said unsaturated polyester and (c) 1 to 25 parts by weight of a thermoplastic polymer of a substance or mixture of substances having a polymerizable reactive $CH_2=C<$ group, which polymer is soluble in monomer (b) but which, when present during the copolymerization of (a) and (b), yields an optically heterogeneous cured composition and molding and curing said polymerizable composition of matter in the presence of fibrous reinforcement under heat and pressure.

2. The method of claim 1 wherein the fibrous reinforcement is a glass material.

3. A method according to claim 2 wherein there is also present a filler.

4. A method in accordance with claim 1 wherein said polyester (a) is a condensation product of an α,β-ethylenically unsaturated dicarboxylic acid with a dihydric alcohol and wherein said thermoplastic polymer (c) is essentially an acrylic resin.

5. A method in accordance with claim 1 wherein the liquid polymerizable composition of matter comprises an unsaturated polyester (a) which is the condensation product of propylene glycol and maleic anhydride, a monomer (b) which is styrene and a thermoplastic polymer (c) which is a copolymer of methyl methacrylate and ethyl acrylate having a molecular weight in the range of 25,000 to 500,000.

6. A method in accordance with claim 1 wherein said liquid polymerizable composition of matter comprises, per 100 parts by weight, 30 to 50 parts of polyester (a), 40 to 60 parts of monomer (b), and 5 to 20 parts of thermoplastic polymer (c).

7. A method in accordance with claim 6 wherein the unsaturated polymerizable polyester (a) is the condensation product of propylene glycol and maleic anhydride, the monomer (b) is styrene and the thermoplastic polymer (c) is a copolymer of methyl methacrylate and ethyl acrylate.

References Cited

UNITED STATES PATENTS

| | | | |
|---|---|---|---|
| 2,609,353 | 9/1952 | Rubens et al. | 260—862 |
| 3,231,634 | 1/1966 | Wismer et al. | 260—862 |
| 2,757,160 | 7/1956 | Anderson. | |
| 3,261,886 | 7/1966 | Lowry. | |

FOREIGN PATENTS

| | | | |
|---|---|---|---|
| 936,351 | 9/1963 | Great Britain | 260—862 |

MORRIS LIEBMAN, Primary Examiner

S. L. FOX, Assistant Examiner

U.S. Cl. X.R.

260—862; 264—331